United States Patent
Seal et al.

(10) Patent No.: US 7,447,871 B2
(45) Date of Patent: Nov. 4, 2008

(54) DATA ACCESS PROGRAM INSTRUCTION ENCODING

(75) Inventors: David James Seal, Cambridge (GB); Vladimir Vasekin, Cambridge (GB)

(73) Assignee: ARM Limited, Cambridge (GB)

( * ) Notice: Subject to any disclaimer, the term of this patent is extended or adjusted under 35 U.S.C. 154(b) by 0 days.

(21) Appl. No.: 11/703,091

(22) Filed: Feb. 7, 2007

(65) Prior Publication Data

US 2007/0136558 A1 Jun. 14, 2007

Related U.S. Application Data

(63) Continuation of application No. 10/765,181, filed on Jan. 28, 2004, now Pat. No. 7,231,507.

(30) Foreign Application Priority Data

Jun. 13, 2003 (GB) .............................. 0313765.0

(51) Int. Cl.
*G06F 12/08* (2006.01)
(52) U.S. Cl. ...................... 711/220; 711/212; 711/214; 712/209; 712/210; 712/221; 712/225
(58) Field of Classification Search .................. None
See application file for complete search history.

(56) References Cited

U.S. PATENT DOCUMENTS 5,987,583 A * 11/1999 Triece et al. ................ 711/214

| 6,282,633 | B1 | 8/2001 | Killian et al. |
| 6,336,178 | B1 | 1/2002 | Favor |
| 6,560,694 | B1 | 5/2003 | McGrath et al. |
| 6,651,160 | B1 | 11/2003 | Hays |
| 6,801,996 | B2 | 10/2004 | Banno et al. |
| 2002/0013691 | A1 | 1/2002 | Warnes |
| 2002/0161989 | A1 | 10/2002 | Swaine |
| 2003/0225998 | A1 | 12/2003 | Khan et al. |
| 2004/0117602 | A1 | 6/2004 | Tripathy et al. |

OTHER PUBLICATIONS

Translation of Japanese official action, Jul. 24, 2006, in corresponding Japanese Application No. 2005-500707.
Mahon et al., "Hewlett-Packard Precision Architecture: The Processor", Hewlett-Packard Journal 37, No. 8 Aug. 1986, pp. 4-21.
S.B. Furber, "VLSi RISC Architecture and Organization" 1989, XP002343490, pp. 172-183 & 238-243.
IPER for PCT/GB03/05684, Oct. 10, 2005.

* cited by examiner

*Primary Examiner*—Gary J Portka
*Assistant Examiner*—Kaushikkumar Patel
(74) *Attorney, Agent, or Firm*—Nixon & Vanderhye P.C.

(57) ABSTRACT

A data processing apparatus 2 is provided which is responsive to data access instructions to perform data access operations. These data access instructions have a first form utilizing a 12-bit offset field but with a fixed addressing mode and a second form utilizing a shorter 8-bit offset field but with an addressing mode specified within a manipulation mode control field of the data access instruction.

21 Claims, 4 Drawing Sheets

DATA ACCESS PROGRAM INSTRUCTION ENCODING

This application is a continuation of U.S. application Ser. No. 10/765,181, filed Jan. 28, 2004, now U.S. pat. No. 7,231,507, which claims foreign priority from GB 0313765.0, filed 13 Jun. 2003, the entire contents of each of which are hereby incorporated by reference.

BACKGROUND OF THE INVENTION

1. Field of the Invention

This invention relates to the field of data processing systems. More particularly, this invention relates to the encoding of data access program instructions for use in data processing systems.

2. Description of the Prior Art

It is known to provide data processing systems with data access instructions. An example of such a class of program instructions is the LDR/LDRB/STR/STRB class of instructions of the ARM instruction set (see for example the ARM Architecture Reference Manual). These are a group of instructions that are orthogonally encoded with respect to each other, in the sense that they specify different main operations, but each main operation can use the same addressing modes or other sub-operations as all the others. The ARM instruction set is a 32-bit instruction set and the LDR/LDRB/STR/STRB class of instructions contains 20 bits that affect the addressing mode calculation:

4 bits (bits[19:16]) to specify the base register;

13 bits (bit[25] and bits[11:0]) to specify either a 12-bit immediate offset (a first form of the instruction) or an index register and a shift (or rotate) to be applied to it (a second form of the instruction); and 3 bits (P=bit[24], U=bit[23], W=bit[21]) to specify the manipulation to be performed on the base register value and the offset. Examples of the addressing modes that may be specified are offset addressing, pre-indexed addressing, post-indexed addressing and unprivileged post-indexed addressing. Such data access instructions provide considerable flexibility in the way that the data access operation may be specified. This helps to reduce the number of instructions required to transfer the desired data to or from memory thereby increasing speed and improving code density.

A common problem within data processing systems is that the encoding bit space available is a finite resource and competing demands are made upon this encoding bit space for different types of instructions which may be useful in different circumstances. It is often the case that the number of potentially useful instructions that might be provided exceeds the encoding bit space available within the processor architecture. Accordingly, measures which can improve the efficiency of use of the encoding bit space are strongly advantageous.

SUMMARY OF THE INVENTION

Viewed from one aspect the present invention provides apparatus for processing data, said apparatus comprising:

a register bank having one or more registers operable to hold respective data values;

a data access circuit operable to perform data access operations transferring one or more data values between said apparatus and addressed memory locations within a memory circuit; and an instruction decoder responsive to data access program instructions to control said data access circuit to perform respective data access operations, each of said data access program instructions including an address offset field that specifies an offset value and including a base register field that specifies a base address register within said register bank and specifying a manipulation to be performed upon said offset value and a base address value held in said base address register to form a memory address value to be accessed within said memory circuit upon execution of said data access program instruction; wherein said data access program instructions have:

(i) a first form including an address offset field having a first address offset field length; and (ii) a second form including an address offset field having a second address offset field length, said first address offset field length being greater than said second address offset field length and said first form being capable of specifying a lesser number of possible manipulations to be performed upon said base address value and said offset value than said second form.

The invention recognises that in practice most programmers and compilers do not make uniform use of the large number of possibilities that may be provided by data access instructions which give large offset fields and a large number of manipulation mode selections. More particularly, as an example, low values of offsets are much more common than high values. Furthermore, simple offset addressing with the offset being added to the base register value is much more common than any other type of manipulation. It is unusual for two or more of the less common options to simultaneously appear, e.g. a large offset value and post-indexed addressing. Statistical analysis of programs indicates that non-uniformity in the distributions of instruction types used is a general characteristic of programs and is not a characteristic of particular programmers or particular compilation strategies. The present invention both recognises and exploits this characteristic. In particular, the present invention provides data access program instructions having a first form including a long offset field and few address manipulation options (or just one) and a second form having a shorter offset field but a larger number of address manipulation options. Thus, the total amount of encoding bit space utilised by the data access instructions may be reduced whilst maintaining the availability of instructions directly providing the desired operations in the overwhelming majority of circumstances.

In preferred embodiments, said manipulation forms a modified address value by one out of:

adding said offset value to said base address value; and subtracting said offset value from said base address value.

In preferred embodiments, said manipulation also allows at least one of the following options for a data access operation:

using said base address value as said memory address value;

using said modified address value as said memory address value;

using said base address value and writing back said modified address value to said base address register as said memory address value; and using said modified address value and writing back said modified address value to said base address register as said memory address value.

In preferred embodiments, said apparatus can operate in a plurality of modes at least one of which is privileged and at least one of which is unprivileged, data accesses being marked either privileged or unprivileged to allow code to be given different levels of access to said memory circuit.

In preferred embodiments at least one form of said manipulation allows a memory access to be forced to be unprivileged regardless of the current mode.

It will be appreciated that the present technique trades off encoding bit space used to specify a manipulation to be applied in the addressing mode against encoding bit space used to specify an offset field. Particularly preferred embodiments are ones in which the first form of the instruction operates with a fixed manipulation which accordingly does not require a manipulation mode control field within the instruction and the second form of the instruction includes a manipulation mode control field specifying one of a plurality of different manipulations which may be used.

It will be appreciated that any manipulations that are available both in the first form of the instruction and in the second form of the instruction result in inefficient use of encoding bit space, since any data access operation that can be performed using such a manipulation in the second form of the instruction can equally well be performed using the same manipulation in the first form of the instruction. So in preferred embodiments, the sets of manipulations provided by said first form and said second form are disjoint.

Viewed from another aspect the present invention provides a method of processing data, said method comprising the steps of:

holding data values within respective ones of one or more registers of a register bank, said register bank forming part of a data processing apparatus;

performing data access operations with a data access circuit to transfer one or more data values between said data processing apparatus and addressed memory locations within a memory circuit; and in response to data access program instructions, controlling said data access circuit with an instruction decoder to perform respective data access operations, each of said data access program instructions including an address offset field that specifies an offset value and including a base register field that specifies a base address register within said register bank and specifying a manipulation to be performed upon said offset value and a base address value held in said base address register to form a memory address value to be accessed within said memory circuit upon execution of said data access program instruction; wherein said data access program instructions have:

(i) a first form including an address offset field having a first address offset field length; and (ii) a second form including an address offset field having a second address offset field length, said first address offset field length being greater than said second address offset field length and said first form being capable of specifying a lesser number of possible manipulations to be performed upon said base address value and said offset value than said second form.

Viewed from a further aspect the present invention provides a computer program product having a computer program operable to control a data processing apparatus, said computer program holding one or more data values for manipulation within respective ones of one or more registers of a register bank, and comprising:

data access code operable to perform data access operations with a data access circuit to transfer one or more data values between said data processing apparatus and addressed memory locations within a memory circuit; wherein said data access code includes a plurality of data access program instructions, each of said data access program instructions including an address offset field that specifies an offset value and including a base register field that specifies a base address register within said register bank and specifying a manipulation to be performed upon said offset value and a base address value held in said base address register to form a memory address value to be accessed within said memory circuit upon execution of said data access program instruction; wherein said data access program instructions include at least one data access program instruction of each of:

(i) a first form including an address offset field having a first address offset field length; and (ii) a second form including an address offset field having a second address offset field length, said first address offset field length being greater than said second address offset field length and said first form being capable of specifying a lesser number of possible manipulations to be performed upon said base address value and said offset value than said second form.

The above, and other objects, features and advantages of this invention will be apparent from the following detailed description of illustrative embodiments which is to be read in connection with the accompanying drawings.

DESCRIPTION OF THE PREFERRED EMBODIMENTS

Figure 1:
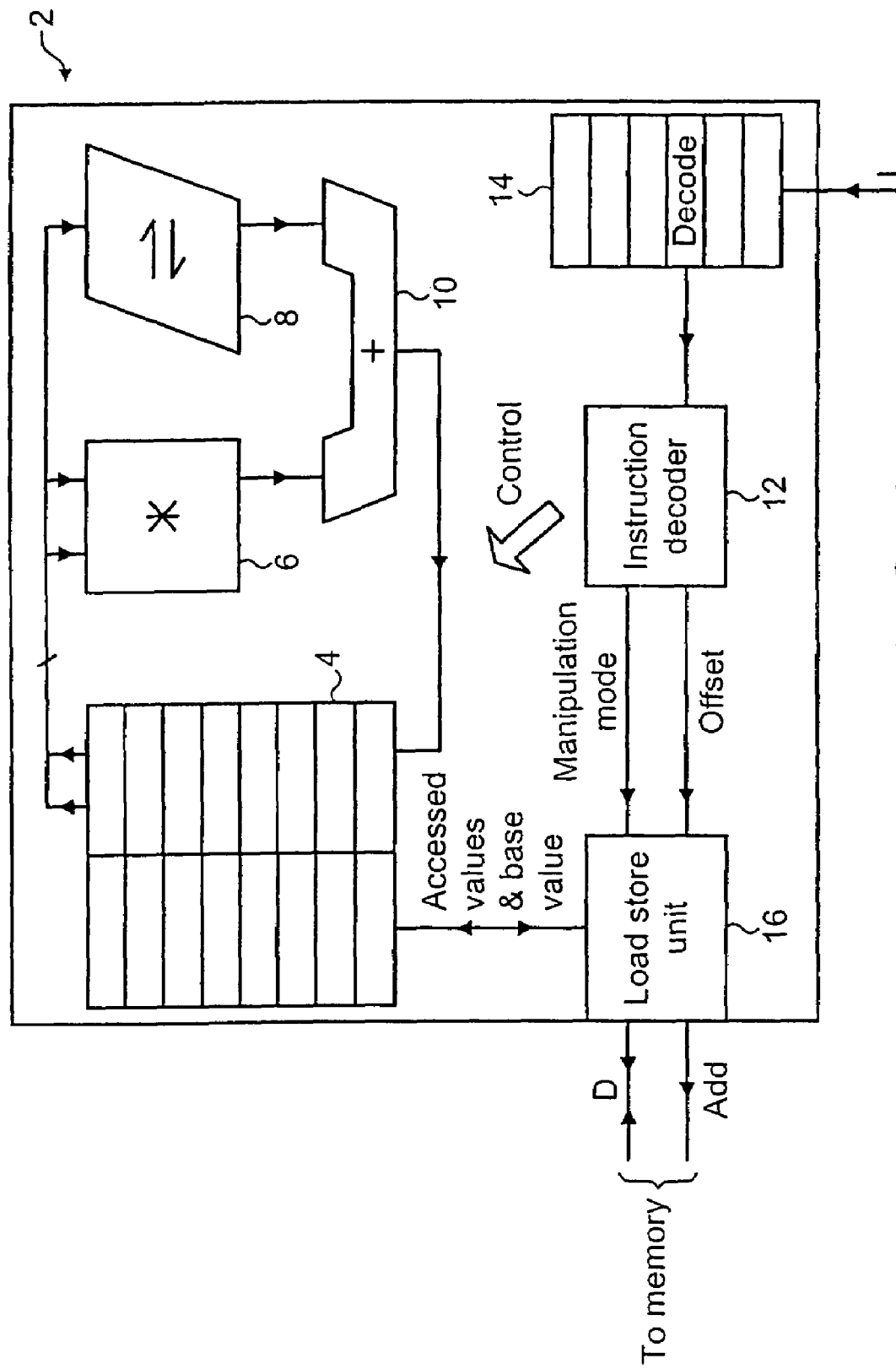
FIG. 1 schematically illustrates a data processing apparatus utilising data access instructions.

FIG. 1 schematically illustrates a data processing apparatus 2 in the form of a processor core containing a register bank 4 having a plurality of program registers for storing respective data values, a multiplier 6, a shifter 8, an adder 10, an instruction decoder 12, an instruction pipeline 14 and a load/store unit 16. It will be appreciated that the data processing apparatus 2 will typically contain many more circuit elements as will be familiar to those in this technical field, but these circuit elements have been omitted from FIG. 1 for the sake of clarity. In operation program instructions are fetched from memory (not illustrated) into the instruction pipeline 14. When a program instruction reaches the decode stage in the instruction pipeline 14, it is decoded by the instruction decoder 12 which generates control signals applied to the data processing logic including the register bank 4, the multiplier 6, the shifter 8 and the adder 10 to perform a desired data processing operation.

One type of program instruction which may be executed and to which the instruction decoder 12 is responsive is a data access instruction. Such a data access instruction specifies a load or a store operation to be performed by the load/store unit 16 to write data to or read from a specified address or sequence of addresses within the memory coupled to the data processing apparatus 2. The data values being accessed are either written to or read from respective registers within the register bank 4 in this load/store architecture type of data processing apparatus. However this is not an essential requirement.

As will be familiar from the type of data access instructions provided by the existing ARM instruction set these data access instructions can specify an immediate offset value and a manipulation mode to be used. The instruction decoder 12 is responsive to fields within the data access instruction specifying these parameters and passes these parameters on to the load/store unit 16 for action. A base register specifier field included in the data access instruction specifies one of the program registers within the register bank 4, which is read by the load/store unit 16 to obtain a base address value to be used in the data access operation. The memory address value used to access memory is formed from this base address value by the manipulation, which may for example consist of the addition of an offset value contained in an address offset field of the instruction. In this apparatus, respective data values that are transferred to or from memory are read from or written to the register bank 4 by the load/store unit 16.

Figure 2:
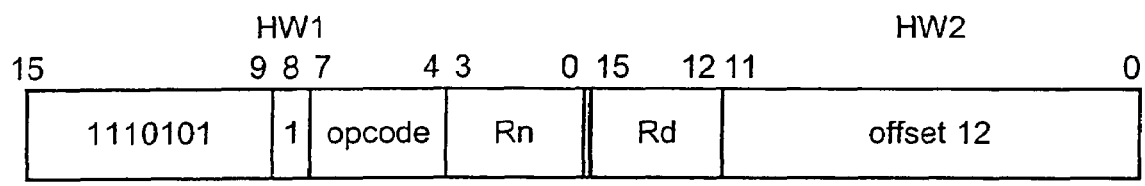
FIG. 2 schematically illustrates a first form of a data access instruction.

FIG. 2 schematically illustrates a first form of data access instruction. This instruction comprises two 16-bit halfwords. In this first form, bit[8]=1 in halfword HW1 to indicate to the instruction decoder 12 that halfword HW2 contains a long 12-bit offset value field offset12 and that the instruction uses a fixed address manipulation, in which the zero-extended offset value is added to the base address value and the result is used as the memory address value for the data access.

The field Rn specifies the register which holds the base address value. The field Rd specifies the register which is to be either the source or the destination of the data access operation. Bits[15:9] of halfword HW1 specify that this instruction is a data access instruction, and bits[7:4] of halfword HW1 are an opcode field which specifies details of the data access to be performed: whether a load or a store is to be performed, the length of the data to be accessed in memory (e.g. an 8-bit byte, a 16-bit halfword or a 32-bit word), and in cases where a narrow data value is being loaded into a wider register, whether the value is to be zero-extended or sign-extended.

Figure 3:
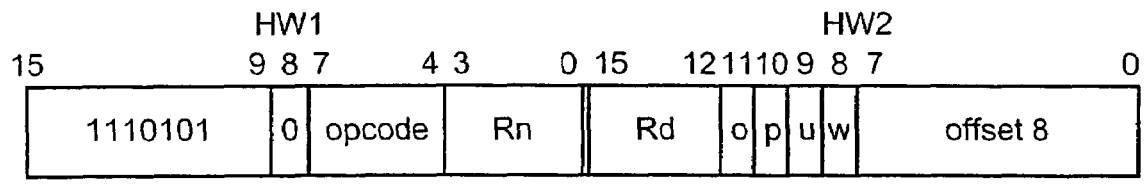
FIG. 3 schematically illustrates a second form of a data access instruction.

FIG. 3 schematically illustrates a second form of data access instruction. In this second form, bit[8]=0 in halfword HW1 to indicate to the instruction decoder 12 that halfword HW2 contains a short 8-bit offset value field offset8 and also contains 3 bits P, U and W that specify the address manipulation to be used. The fields Rn and Rd, and bits[15:9] and bits[7:4] of halfword HW1 specify the same things as they do in FIG. 2.

The U bit specifies whether the zero-extended offset value is to be added to or subtracted from the base address value to form a modified address value.

The P bit specifies whether the memory address value used for the data access is the base address value or the modified address value.

The W bit specifies whether the register which holds the base address value is left unchanged or has the modified address value written back to it.

In addition, when the P, U and W bits specify the address manipulation used by the first form (that is, the offset is added to the base address value, the modified address value is used for the data access, and the register which holds the base address value is left unchanged), the data access is marked as unprivileged regardless of whether the processor is in an unprivileged or privileged mode of operation. It will be appreciated that this combination of the P, U and W bits would otherwise be redundant, as the first form of the instruction makes the required data access operations available.

It will be seen from the above that the first form of the data access instruction illustrated in FIG. 2 provides a large offset field at the expense of a fixed address manipulation whereas the second form of the data access instruction as illustrated in FIG. 3 provides a smaller offset field but does give a larger number of options for the address manipulation to be performed. It has been found that the combination of the data access instruction of the first form and the second form is particularly advantageous in providing good coverage to the type of data access operations which are desired whilst reducing the amount of encoding bit space used to specify these parameters. The encoding bit space saved may then be used for other purposes to considerable advantage. The above encoding requires 13 bits to specify the offset and the address manipulation (HW1[8] and HW2[11:0]), whereas a simple (P, U, W, offset 12) encoding as used in the ARM instruction set would require 15.

As an alternative encoding it is also possible to use:
HW1[15:9]=1111100 rather than 1110101 as shown in FIGS. 2 and 3.
HW1[7] to distinguish the two forms of the instruction rather than
HW1[8], and HW1[8,6:4] as the opcode field rather than HW1[7:4].
In FIG. 3, HW2[11]=1 rather than 0 as shown.

Figure 4:
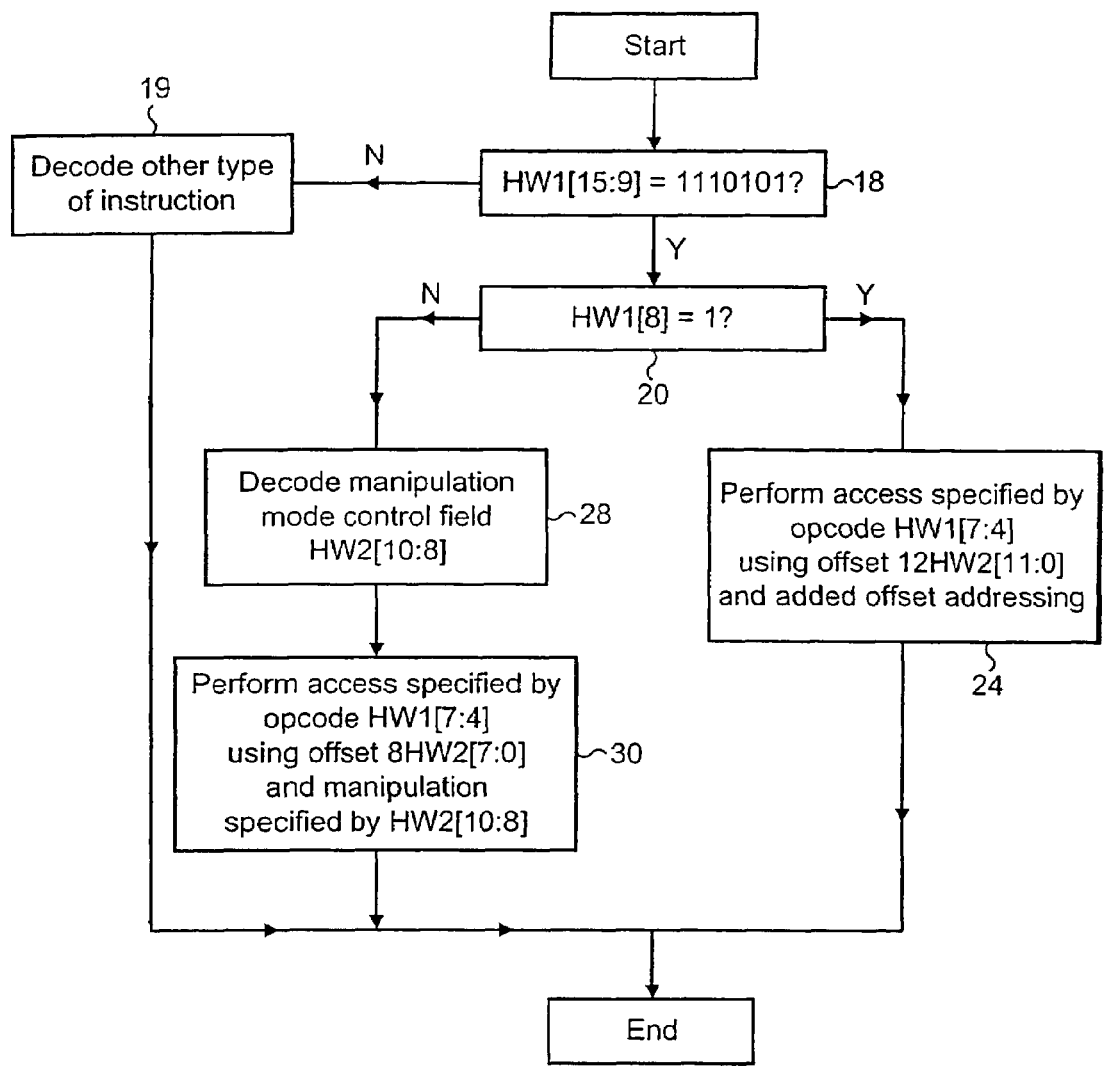
FIG. 4 is a flow diagram schematically illustrating the operation of an instruction decoder in decoding data access instructions of the first form and of the second form.

FIG. 4 is a flow diagram schematically illustrating the processing operation performed by the instruction decoder 12. It will be appreciated that the sequential processing illustrated in FIG. 4 may not in practice happen within the instruction decoder 12 wherein considerable parallelism may be employed. However, FIG. 4 assists in providing an understanding of the decoding required and the operations performed.

At step 18 the instruction decoder identifies a data access instruction by the most significant seven bits of the first halfword HW1. If another type of instruction is identified then this is decoded at step 19. At step 20 the instruction decoder 12 examines bit [8] within the halfword HW1 to determine whether the data access instruction is one of the first form or one of the second form. If this bit [8] is equal to "1", then the data access instruction has the first form and processing proceeds to step 24 at which the opcode is decoded to determine further parameters associated with the data access instruction desired and the long 12-bit offset value is used with the fixed manipulation mode of offset addressing with the offset being added.

If the determination at step 20 was that bit [8]=0, then processing proceeds to step 28 where the manipulation mode control field [10:8] of halfword HW2 is decoded to determine which of the previously mentioned address manipulation modes is to be used. Then at step 30 the data access specified by the opcode HW1[7:4] is performed using the smaller 8-bit offset value and the specified manipulation.

Figure 5:
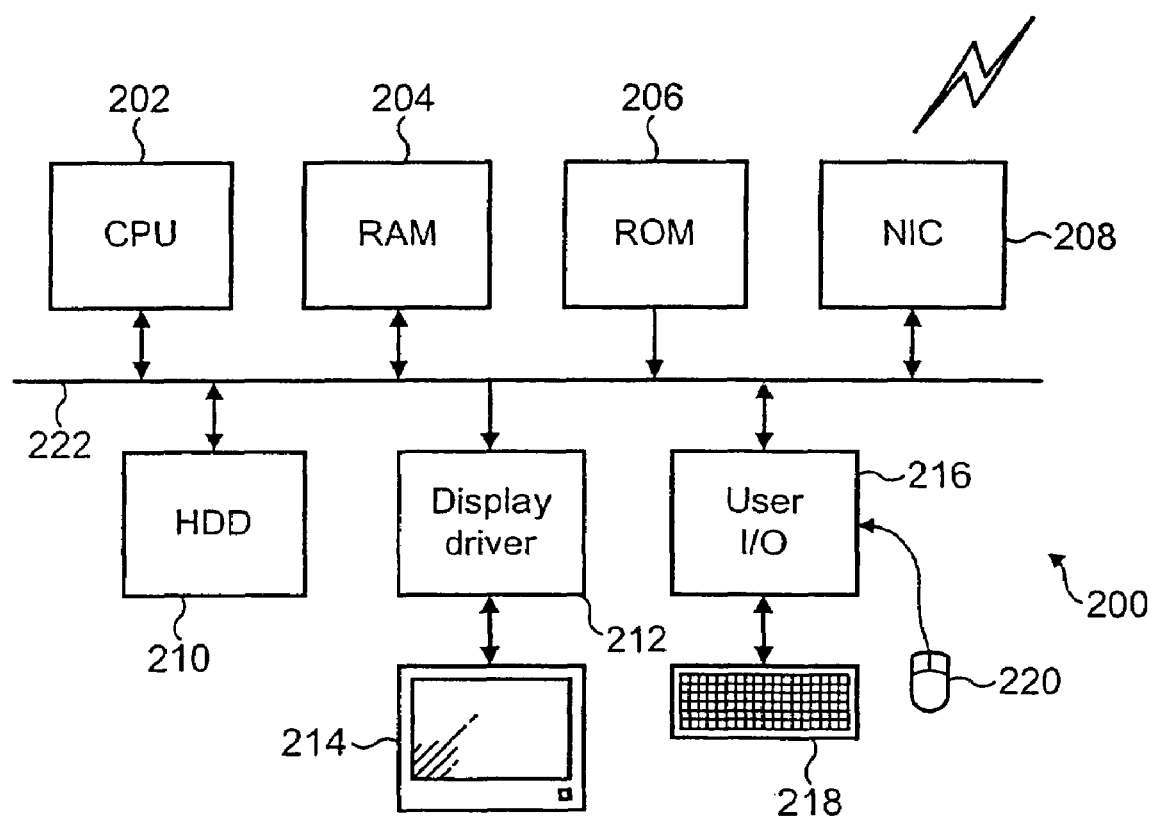
FIG. 5 is a diagram schematically illustrating the architecture of a general purpose computer which may implement program instructions in accordance with the above described techniques.

FIG. 5 schematically illustrates a general purpose computer 200 which may implement program instructions in accordance with the above described techniques. The general purpose computer 200 includes a central processing unit 202, a random access memory 204, a read only memory 206, a network interface card 208, a hard disk drive 210, a display driver 212 and monitor 214 and a user input/output circuit 216 with a keyboard 218 and mouse 220 all connected via a common bus 222. In operation the central processing unit 202 will execute computer program instructions that may be stored in one or more of the random access memory 204, the read only memory 206 and the hard disk drive 210 or dynamically downloaded via the network interface card 208. The results of the processing performed may be displayed to a user via the display driver 212 and the monitor 214. User inputs for controlling the operation of the general purpose computer 200 may be received via the user input output circuit 216 from the keyboard 218 or the mouse 220. It will be appreciated that the computer program could be written in a variety of different computer languages. The computer program may be stored and distributed on a recording medium or dynamically downloaded to the general purpose computer 200. When operating under control of an appropriate computer program, the general purpose computer 200 can perform the above described techniques and can be considered to form an apparatus for performing the above described technique. The architecture of the general purpose computer 200 could vary considerably and FIG. 5 is only one example.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope and spirit of the invention as defined by the appended claims.

We claim:

1. Apparatus for processing data, said apparatus comprising:
    a register bank having one or more registers operable to hold respective data values;
    a data access circuit operable to perform data access operations transferring one or more data values between said apparatus and addressed memory locations within a memory circuit; and
    an instruction decoder responsive to data access program instructions to control said data access circuit to perform respective data access operations, each of said data access program instructions including an address offset field that specifies an offset value and including a base register field that specifies a base address register within said register bank and specifying a manipulation to be performed upon said offset value and a base address value held in said base address register to form a memory address value to be accessed within said memory circuit upon execution of said data access program instruction; wherein
    said data access program instructions have:
    (i) a first form including an address offset field having a first address offset field length; and
    (ii) a second form including an address offset field having a second address offset field length, said first address offset field length being greater than said second address offset field length by an amount that permits a wider range of memory address values to be formed with said first form than with said second form and said first form being capable of specifying a lesser number of possible manipulations to be performed upon said base address value and said offset value than said second form;
    said offset value is an unsigned value; and
    a manipulation supported by said second form but not by said first form forms a modified address value by a specifiable one of:
    adding said offset value to said base address value; and
    subtracting said offset value from said base address value.

2. Apparatus as claimed in claim 1, wherein said manipulation also allows at least one of the following options for a data access operation:
    using said base address value as said memory address value;
    using said modified address value as said memory address value;
    using said base address value and writing back said modified address value to said base address register as said memory address value; and
    using said modified address value and writing back said modified address value to said base address register as said memory address value.

3. Apparatus as claimed in claim 1, wherein said apparatus can operate in a plurality of modes at least one of which is privileged and at least one of which is unprivileged, data accesses being marked either privileged or unprivileged to allow code to be given different levels of access to said memory circuit.

4. Apparatus as claimed in claim 1, wherein data access program instructions of said first form operate with a fixed manipulation in which a sum of said base address value and said offset value is used as said memory address value and said base address value is unchanged after execution.

5. Apparatus as claimed in claim 1, wherein said data access program instructions of said second form includes a manipulation mode control field specifying which one of a plurality of different manipulations is to be used.

6. Apparatus as claimed in claim 1 wherein the sets of manipulations provided by said first form and said second form are disjoint.

7. Apparatus as claimed in claim 1, wherein said data values are transferred between respective registers of said register bank and said addressed memory locations.

8. A method of processing data, said method comprising the steps of:
    holding data values within respective ones of one or more registers of a register bank, said register bank forming part of a data processing apparatus;
    performing data access operations with a data access circuit to transfer one or more data values between said data processing apparatus and addressed memory locations within a memory circuit; and
    in response to data access program instructions, controlling said data access circuit with an instruction decoder to perform respective data access operations, each of said data access program instructions including an address offset field that specifies an offset value and including a base register field that specifies a base address register within said register bank and specifying a manipulation to be performed upon said offset value and a base address value held in said base address register to form a memory address value to be accessed within said memory circuit upon execution of said data access program instruction; wherein
    said data access program instructions have:
    (i) a first form including an address offset field having a first address offset field length; and
    (ii) a second form including an address offset field having a second address offset field length, said first address offset field length being greater than said second address offset field length by an amount that permits a wider range of memory address values to be formed with said first form than with said second form and said first form being capable of specifying a lesser number of possible manipulations to be performed upon said base address value and said offset value than said second form;
    said offset value is an unsigned value; and
    a manipulation supported by said second form but not by said first form forms a modified address value by a specifiable one of:
    adding said offset value to said base address value; and
    subtracting said offset value from said base address value.

9. A method as claimed in claim 8, wherein said manipulation also allows at least one of the following options for a data access operation:
- using said base address value as said memory address value;
- using said modified address value as said memory address value;
- using said base address value and writing back said modified address value to said base address register as said memory address value; and
- using said modified address value and writing back said modified address value to said base address register as said memory address value.

10. A method as claimed in claim 8, wherein said method is operable in a plurality of modes at least one of which is privileged and at least one of which is unprivileged, data accesses being marked either privileged or unprivileged to allow code to be given different levels of access to said memory circuit.

11. A method as claimed in claim 8, wherein data access program instructions of said first form operate with a fixed manipulation in which a sum of said base address value and said offset value is used as said memory address value and said base address value is unchanged after execution.

12. A method as claimed in claim 8, wherein said data access program instructions of said second form includes a manipulation mode control field specifying which one of a plurality of different manipulations is to be used.

13. A method as claimed in claim 8, wherein the sets of manipulations provided by said first form and said second form are disjoint.

14. A method as claimed in claim 8, wherein said data values are transferred between respective registers of said register bank and said addressed memory locations.

15. A computer program embodied in a computer readable storage medium for controlling a data processing apparatus, to perform the following:
- holding one or more data values for manipulation within respective ones of one or more registers of a register bank,
- data access code operable to perform data access operations with a data access circuit in response to data access code to transfer one or more data values between said data processing apparatus and addressed memory locations within a memory circuit; wherein
- said data access code includes a plurality of data access program instructions, each of said data access program instructions including an address offset field that specifies an offset value and including a base register field that specifies a base address register within said register bank and specifying a manipulation to be performed upon said offset value and a base address value held in said base address register to form a memory address value to be accessed within said memory circuit upon execution of said data access program instruction; wherein
- said data access program instructions include at least one data access program instruction of each of:
  (i) a first form including an address offset field having a first address offset field length; and
  (ii) a second form including an address offset field having a second address offset field length, said first address offset field length being greater than said second address offset field length by an amount that permits a wider range of memory address values to be formed with said first form than with said second form and said first form being capable of specifying a lesser number of possible manipulations to be performed upon said base address value and said offset value than said second form;
- said offset value is an unsigned value; and
- a manipulation supported by said second form but not by said first form forms a modified address value by a specifiable one of:
- adding said offset value to said base address value; and
- subtracting said offset value from said base address value.

16. A computer program as claimed in claim 15, wherein said manipulation also allows at least one of the following options for a data access operation:
- using said base address value as said memory address value;
- using said modified address value as said memory address value;
- using said base address value and writing back said modified address value to said base address register as said memory address value; and
- using said modified address value and writing back said modified address value to said base address register as said memory address value.

17. A computer program as claimed in claim 15, wherein said method is operable in a plurality of modes at least one of which is privileged and at least one of which is unprivileged, data accesses being marked either privileged or unprivileged to allow code to be given different levels of access to said memory circuit.

18. A computer program as claimed in claim 15, wherein data access program instructions of said first form operate with a fixed manipulation in which a sum of said base address value and said offset value is used as said memory address value and said base address value is unchanged after execution.

19. A computer program as claimed in claim 15, wherein said data access program instructions of said second form includes a manipulation mode control field specifying which one of a plurality of different manipulations is to be used.

20. A computer program as claimed in claim 15, wherein the sets of manipulations provided by said first form and said second form are disjoint.

21. A computer program as claimed in claim 15, wherein said data values are transferred between respective registers of said register bank and said addressed memory locations.

* * * * *